United States Patent [19]

Mettke

[11] Patent Number: 5,602,905
[45] Date of Patent: Feb. 11, 1997

[54] ON-LINE COMMUNICATION TERMINAL/APPARATUS

[76] Inventor: Richard P. Mettke, 620 Shannahan Dr., Weaver, Ala. 36277

[21] Appl. No.: 376,247

[22] Filed: Jan. 23, 1995

[51] Int. Cl.$^6$ ............................................. H04M 11/00
[52] U.S. Cl. ........................................ 379/96; 379/91
[58] Field of Search ............................. 379/100, 91, 96, 379/97, 98, 93, 94, 144, 155; 358/401, 442; 235/380, 381, 382; 364/401, 408

[56] References Cited

U.S. PATENT DOCUMENTS

| | | | |
|---|---|---|---|
| 4,902,881 | 2/1990 | Janku | 235/380 |
| 5,008,928 | 4/1991 | Cleghorn | 379/144 |
| 5,218,633 | 6/1993 | Clagett et al. | 379/96 |
| 5,247,575 | 9/1993 | Sprague et al. | 379/100 |
| 5,272,747 | 12/1993 | Meads | 379/144 |
| 5,333,181 | 7/1994 | Biggs | 379/144 |
| 5,393,964 | 2/1995 | Hamilton et al. | 379/91 |
| 5,396,546 | 3/1995 | Remillard | 379/96 |

*Primary Examiner*—Curtis Kuntz
*Assistant Examiner*—Stella L. Woo

[57] ABSTRACT

A "pay-as-you-use" communication terminal capable of interfacing with all major commercial on-line communications services (I.E. American On-Line, Prodigy, CompuServe, Genie, Delphi, Eworld). Users can receive a hard copy of any activity that they conduct from the terminal through the co-located printer. Payment of services will be made by credit card, using a "magnetic swipe" system included as part of the terminal system. Users will be charged for use of the system as well as normal telephone charges.

5 Claims, 1 Drawing Sheet

ON-LINE COMMUNICATION TERMINAL/APPARATUS

BACKGROUND—FIELD OF INVENTION

This invention relates to an electronic pay-as-you-use message terminal/apparatus capable of interfacing with all major commercial on-line services.

BACKGROUND—DESCRIPTION OF PRIOR ART

In the past few years there has been a remarkable growth in the use of commercial on-line service providers (I.E. PRODIGY, COMPUSERVE, AMERICAN ON-LINE, and DELPHI) machines. The use of the above listed services are normally conducted in the home or office.

Individuals and businesses constantly draw from the wealth of data bases of information available from the commercial on-line services. Commercial on-line members also access the services for personal and leisure activities (I.E. play games, news or sports updates, weather reports, shopping, traveling, browsing ETC.) These services are generally accessed from fixed site locations at home or in the office. Although, portable terminals (lap top computers) with modems are available; they are often cumbersome and are not user friendly for a travelling business people or other users of commercial on-line services on the road.

There are various devices/apparatuses for conducting the operations/applications described previously. There is however, no one device/apparatus that brings these operations/applications together and offers their use on a pay-as-you-use basis. A listing of known prior art:

- U.S. Pat. No. 4,092,527—A calculator with interchangeable keyboards having different preselected configurations of numeric and/or function keys.
- U.S. Pat. No. 4,274,081—A data input apparatus including a keyboard and plurality of interchangeable mats which define the function of the 39 keyboard keys.
- U.S. Pat. No. 4,374,381—A touch terminal which communicates and controls a microprocessor.
- U.S. Pat. No. 4,482,955—A keyboard having an on board microprocessor for controlling keyboard functions.
- U.S. Pat. No. 4,660,218—Automatic switch apparatus for automatically switching between a telephone set and a terminal device.
- U.S. Pat. No. 5,334,823—Systems and methods for operating Data card terminals for transaction chargeback protection.
- U.S. Pat. No. 5,235,680—Apparatus and method for communicating textual and image information between a host computer and remote display terminal.

As stated previously, the above cited prior art devices/apparatuses have provided the majority of the technical applications/capabilities for this on-line terminal; however none are brought together to provide for the pay-as-you-use applications/capabilities of this device/apparatus.

Accordingly, there is no one device/apparatus that allows a user, to access, on a pay-as-you-use basis, a commercial on-line service on an interactive basis. The terminals would be located in such diverse locations as airports, hotels, business centers, libraries, hospitals, shopping malls and other locations as appropriate.

SUMMARY OF THE INVENTION

The present invention disclosed herein comprises a system for accessing commercial on-line services on a pay-as-you-use basis. The system includes a Central Processing Unit (CPU), internal modem, monitor, printer, credit card reading swipe device and housing. Accordingly, besides the objects and advantages of this device/apparatus described previously in my application, several objects and advantages are (some restated):

(a) Users can conveniently access commercial on-line services and the Internet at other locations other than from their fixed terminal at an office or home.

(d) Users can receive a hard copy document from a laser printer of any activity that they conduct at the terminal.

(e) Users will pay for the use of the terminal using a credit card swipe apparatus. The user will be charged for use of the terminal, telephone line use charges and additional charges by the commercial on-line service or internet provider.

(f) Commercial on-line services will benefit greatly by the additional exposure/access of their services.

(g) Users will have the convenience of having easy access to the services provided by the terminal at a reasonable price; negating the need for frequent travelers to unnecessarily carry around a cumbersome laptop terminal with accessories for conducting on-line activities.

DETAILED DESCRIPTION OF THE INVENTION

Figure 1:
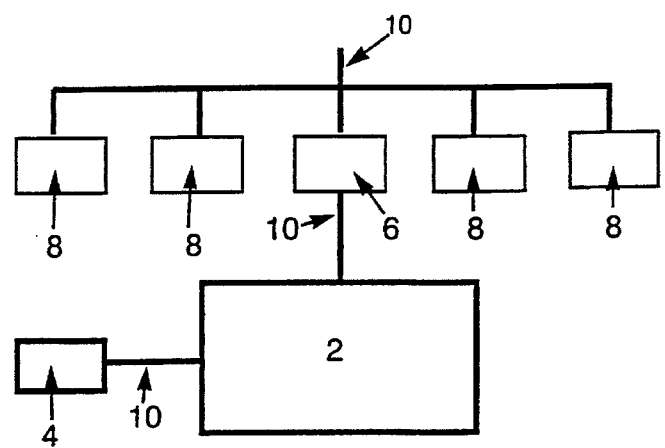
FIG. 1 A typical functional embodiment is schematically illustrated by block diagram form in FIG. 1.

A typical functional embodiment is schematically illustrated by block diagram form in FIG. 1. Numeral 2 generally indicates the Terminal device which is comprised of the monitor, keyboard w/mouse, central processing unit w/internal modem (14.4–28 BPS), integrating software, laser printer, credit card swiping device, telephone and telephone lines. Numeral 4 generally indicates the credit card processing service/center. Numeral 6 generally indicates the local telephone node/switching node. Numeral 8 generally indicates the feeder/access nodes for the commercial on-line service/Internet provider. Numeral 10 generally indicates the servicing telephone line.

Figure 2:
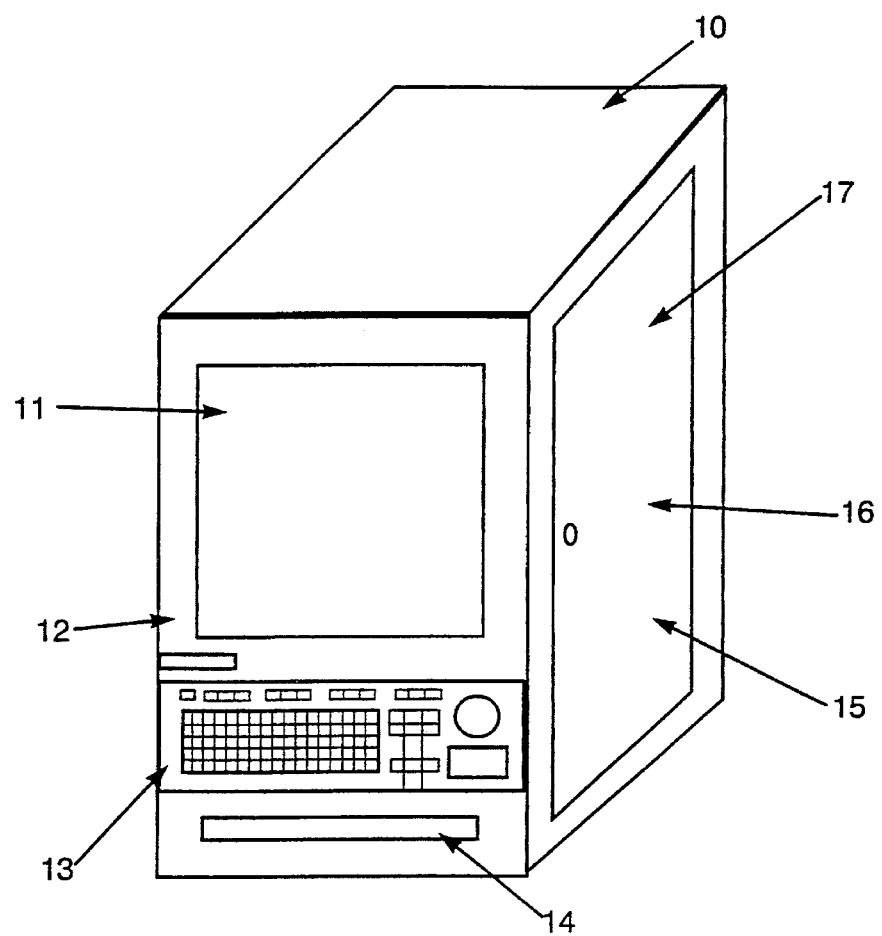
FIG. 2 A typical embodiment of the terminal is illustrated in diagram form in FIG. 2.

"A typical embodiment of the terminal is illustrated in FIG. 2. Numeral 10 generally indicates the housing for the terminal. Numeral 11 generally indicates the monitor. Numeral 12 generally indicates the credit card reader swipe device. Numeral 13 generally indicates the keyboard. Numeral 14 generally indicates the printer paper discharge chute. Numeral 15 generally indicates the location of the printer behind the terminals access door. Numeral 16 generally indicates the location of the CPU with internal modem behind the terminals access door. Numeral 17 generally indicates the location of the access door."

"A representative CPU with internal modem, monitor and printer could be of the IBM AST series. A representative touch screen with controller could be of the series manufactured by Interaction Systems. A representative credit card reader could be the MAGTEK 21055002. "

Interconnection and operatability of the components is not discussed in greater detail since the technology is well known in prior art.

Accordingly, the reader will see that this invention has unlimited potential and promise in this ever emerging information age. The invention would be a convenience for business people and travelers providing easy access to on-line services that are quickly become the norm in day to day living. While particular embodiments of this invention have been described for purposes of illustration, these involve no limitations and the invention may be carried into practice by persons skilled in the art in a variety of ways without departing from its spirit or from the ambit of the claims.

I claim:

1. A public on-line, pay-as-you-use communications terminal comprising a housing, wherein said housing contain:
   a central processing unit (CPU);
   a telephone access node;
   an internal modem coupled to the CPU and telephone access node;
   a video display monitor coupled to the CPU;
   a keyboard for providing user interface coupled to the CPU;
   a credit card reader swipe device coupled to the CPU for accepting payment by a user for use of the terminal;
   means for accessing commercial on-line services and allow for user interaction;
   software installed into the CPU to allow interface with commercial on-line service providers and credit card service centers;
   a printer coupled to the CPU.

2. The terminal in accordance with claim 1 wherein said means for accessing includes a touch screen interface attached to the monitor and further includes a touch screen means for accepting input information from said touch screen interface and modifying program execution accordingly.

3. The terminal in accordance with claim 1 also including, within said housing, program means for causing said printer to print a receipt or any other document available from a commercial on-line service.

4. The terminal in accordance with claim 1 wherein said housing includes a durable enclosure for the CPU, monitor, internal modem and printer, and a secured access door for service and repair.

5. A method of using a public on-line, pay-as-you-use terminal to access commercial on-line services comprising the steps of:

swiping a credit card through a credit card swipe device; if credit is is denied, disallowing interaction; if credit is approved, receiving charge approval from a credit card center for use of the terminal; communicating said approval to CPU executing a main program; in response to input from a user who is responding to a selection of on-line services that are assessable and displayed on a monitor in communication with said CPU and, based on interaction between said user and said main program, controlling switching means with said CPU to provide communication between a telephone access node and a modem with a commercial on-line service; printing with a printer a hard copy of documents said user requires, said printer being in communication with the CPU; deactivating said CPU from commercial on-line service user interaction on appropriate input from said user; printing with said printer a billing statement.

* * * * *